US006684267B2

(12) United States Patent  
Hiji

(10) Patent No.: US 6,684,267 B2
(45) Date of Patent: Jan. 27, 2004

(54) DIRECT MEMORY ACCESS CONTROLLER, AND DIRECT MEMORY ACCESS CONTROL METHOD

(75) Inventor: Yoshihiro Hiji, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 272 days.

(21) Appl. No.: 10/017,321

(22) Filed: Dec. 18, 2001

(65) Prior Publication Data

US 2002/0169900 A1 Nov. 14, 2002

(30) Foreign Application Priority Data

May 11, 2001  (JP) ........................................ 2001-142459

(51) Int. Cl.⁷ ............................................. G06F 13/00
(52) U.S. Cl. ......................... 710/22; 710/35; 710/308; 710/310
(58) Field of Search ....................... 710/22–35, 48, 710/52–57, 308–310; 711/147

(56) References Cited

U.S. PATENT DOCUMENTS

| | | | | |
|---|---|---|---|---|
| 4,797,851 A | | 1/1989 | Suzuki ........................ 710/26 |
| 5,530,902 A | * | 6/1996 | McRoberts et al. ........... 710/28 |
| 5,535,362 A | * | 7/1996 | Ami et al. .................. 711/147 |
| 5,574,944 A | * | 11/1996 | Stager .......................... 710/5 |
| 5,630,172 A | * | 5/1997 | Ami et al. ..................... 710/25 |
| 5,884,100 A | * | 3/1999 | Normoyle et al. ............ 710/52 |
| 6,324,594 B1 | * | 11/2001 | Ellis et al. ...................... 710/5 |
| 6,449,666 B2 | * | 9/2002 | Noeldner et al. ............. 710/23 |
| 6,553,435 B1 | * | 4/2003 | Normoyle et al. ........... 710/22 |
| 6,604,156 B1 | * | 8/2003 | Slivkoff et al. ............... 710/57 |

FOREIGN PATENT DOCUMENTS

JP      6-161944      6/1994

* cited by examiner

*Primary Examiner*—Christopher B. Shin
(74) *Attorney, Agent, or Firm*—Staas & Halsey LLP

(57) ABSTRACT

The read position or write position of data is decided by the base address of a ring buffer and an offset from the base address and the offset is updated by the amount of DMA-transferred data. When the offset becomes equal to or more than a value that indicates a total amount of transferred data, the offset is reset to zero to generate an address for circulating through and accessing the ring buffer. Moreover, a stop address showing the stop position of the DMA transfer operation is set to update the stop address by the amount of data read from or written in the ring buffer without depending on the DMA transfer operation. When the offset coincides with the stop address, the DMA transfer operation is stopped.

18 Claims, 9 Drawing Sheets

DIRECT MEMORY ACCESS CONTROLLER, AND DIRECT MEMORY ACCESS CONTROL METHOD

FIELD OF THE INVENTION

The present invention relates to a used for transferring data between a buffer area formed on a memory and another area on the memory or an input/output unit without using a CPU of a computer system.

BACKGROUND OF THE INVENTION

In general, the data transfer operation by direct memory access is faster than the operation when a CPU transfers data in accordance with control by a program. Therefore, the direct memory access operation is frequently used for data transfer between a high-speed input/output unit and a memory, that is, data transfer relating to the input/output operation.

In the case of a computer system, a ring buffer is set on a memory in accordance with the control by a program executed by a CPU and data may be transferred between the ring buffer and an input/output unit. In the case of the system of this type, the data read from an input apparatus is temporarily stored in a ring buffer to wait for the processing by a CPU to start. Moreover, the data processed by the CPU is temporarily stored in the ring buffer while waiting for the data to be output from an output unit and then successively fetched from the ring buffer and sent to the output unit.

Among recent direct memory access controllers, there is a controller making it possible to perform the direct memory access transfer using a ring buffer as a data transfer destination or data transfer source by adding a function for generating an address so as to circulate through a constant area serving as a ring buffer on a memory and access the area and a function for detecting that the ring buffer is full and stopping the transfer operation. It is possible to continue transfer of data because a data write position is returned to the head of the ring buffer by the above address-generating function even if the data write position reaches the end of the ring buffer while incrementing an address and transferring the data to the ring buffer.

The above address-generating function is realized by suppressing the carry from a low-order specific bit to a high-order bit when calculating an address. For example, when using a 64 KB ring buffer for a 32-bit-byte-addressing system, the carry from low-order 16 bits to the 17th bit is suppressed. Thus, because digits higher than the 17th bit are not updated, it is possible to circulate through and access a 64 KB memory area designated by high-order 16 bits. Moreover, to realize the above address-generating function, it is also allowed to set an initial value to an address register again when completing transfer of the data same amount as the size of a memory area assigned to a ring buffer.

Moreover, in the case of a system expanded so as to access a ring buffer by adding only a function for generating the above circulating address to a conventional direct memory access controller which does not access a ring buffer, the above transfer-operation-stopping function is realized by designating a stopping condition by a transferred amount of data. In this case, the size of an empty area in a ring buffer is designated as a transferred amount of data and the data transfer operation stops when the ring buffer becomes full, that is, the size of the empty area in the ring buffer becomes zero.

Furthermore, to realize the above-mentioned transfer-operation-stopping function, it is allowed to provide a flag for the data in the ring buffer and detect an empty area in the ring buffer by the flag. For example, when the minimum unit for transfer with the ring buffer is a word, a flag showing whether the word is empty or not is provided for each word. Then, a value showing not being empty is set to a flag corresponding to a memory area in which data is written. Moreover, a value showing being empty is set to a flag corresponding to a memory area from which data is read. When a value showing not being empty is set to all flags, the data transfer operation stops.

However, to realize the above address-generating function by suppressing the carry from a low-order specific bit to a high-order bit, there is a disadvantage that the size of a memory area used for a ring buffer is restricted to 2n bytes (where n is an integer). Moreover, there is a disadvantage that the head address of a buffer area must be present at a 2n-byte boundary. However, to realize the above address-generating function by setting an initial value to an address register again, a register having bits equal to the number of address bits is necessary in order to hold the value to be set again and thereby, a circuit size increases.

Moreover, to realize the above transfer-operation-stopping function by designating the size of an empty area in a ring buffer as the transferred amount of data, there is a problem that the transfer capacity of a direct memory access controller is suppressed because it is difficult to perform the parallel processing with software to be executed by a CPU. For example, a case is considered in which a direct memory access controller stores the data read from an input apparatus in a ring buffer by means of direct memory access transfer and the software to be executed by a CPU fetches processes the data. In this case, the direct memory access controller decreases the transferred amount of data in accordance with the transferred amount of data whenever transferring data to the ring buffer. However, the CPU fetches data from the ring buffer, frees an area in the ring buffer in accordance with the fetched amount of data, and increases the transferred amount of data in accordance with the size of the freed area.

Because a CPU using a load/store architecture does not have a function for exclusively updating a value stored in a memory, the CPU requires operations of three stages of loading the transferred amount of data in a register, increasing the loaded value, and then rewriting the value when updating the transferred amount of data. When a direct memory access controller updates the transferred amount of data in the middle of these three stages, the transferred amount of data is not correctly updated. Therefore, to prevent that the CPU and the direct memory access controller update the transferred amount of data at the same time, the direct memory access controller temporarily stops operations while the CPU updates the transferred amount of data. For this reason, the transfer capacity of the direct memory access controller is suppressed.

Moreover, to realize the above transfer-operation-stopping function by providing a flag for the data in the ring buffer, there are problems that an extra memory is consumed by the flag and that a memory area assigned to the flag must be initialized when starting using a certain area of the memory as a ring buffer.

SUMMARY OF THE INVENTION

It is an object of this invention to provide a direct memory access controller capable of direct-memory-access-transferring data by using a ring buffer as an access object without increasing a circuit size or lowering a transfer capacity for direct memory access, having high versatilities of the size and address of a memory area assigned to the ring buffer, and moreover capable of reducing a memory capacity required to access the ring buffer. Moreover, it is another object of the present invention to provide a direct memory access method capable of direct-memory-access-transferring data by using a ring buffer as an access object without deteriorating the transfer capacity of direct memory access.

To achieve the above objects, the present invention is provided with a first register (SBA register) which stores the base address of a transfer-source area, a second register (DBA register) which stores the base address of a transfer-destination area, a third register (PIX register) which stores a data read position in the transfer-source area as the offset from the base address stored in the first register, a fourth register (SIX register) which stores a data write position in the transfer-destination area as the offset from the base address stored in the second register, and a fifth register (BCL register) which stores a value that indicates a total amount of transferred data.

To perform direct memory access transfer by using a ring buffer as a transfer source, the fixed address of a transfer destination in the second register and a stop address showing a stop position of the direct memory access transfer operation is stored in the fourth register. Moreover, after the data read from the ring buffer is written in the transfer destination, an offset showing a position for the ring buffer to read data at the next time is updated by the transferred amount of data. When the updated offset is equal to or more than the value that indicates a total amount of transferred data, the offset is reset to zero. The above operations are repeated until an offset for reading data at the next time coincides with the stop address.

To perform direct memory access transfer by using a ring buffer as an transfer destination, the fixed address of a transfer source is stored in the first register and a stop address showing a stop position of the direct memory access operation is stored in the fourth register. Then, after the data read from the transfer source is written in the ring buffer, an offset showing a position for the ring buffer to write data at the next time is updated by the transferred amount of data. When the updated offset is equal to or more than the value that indicates a total amount of transferred data, the offset is reset to zero. The above operations are repeated until the an offset for the ring buffer to write data at the next time coincides with the stop address.

According to the present invention, to perform direct memory access transfer by using a ring buffer as a transfer source, a data read position is decided in accordance with the base address of the ring buffer and the offset from the base address. To perform direct memory access transfer by using the ring buffer as a transfer destination, a data write position is decided in accordance with the base address of the ring buffer and the offset from the base address. The offset showing the read position or write position of the ring buffer is updated by the amount of data transferred by the direct memory access transfer operation and is reset to zero when the offset is equal to or more than the value that indicates a total amount of transferred data. Therefore, an address is generated so as to make an access by circulating between the base address of ring buffer and an address decided in accordance with the value that indicates a total amount of transferred data.

Moreover, according to the present invention, an offset showing the read position or write position of a ring buffer is updated by the amount of data transferred in accordance with the direct memory access transfer operation while a stop address is updated by the amount of data read or written by a CPU or the like without depending on the direct memory access transfer operation. Therefore, a depending relation does not occur in their update timings.

Other objects and features of this invention will become apparent from the following description with reference to the accompanying drawings.

DETAILED DESCRIPTION

Embodiments of the direct memory access controllers and direct memory access control methods according to the present invention are described below in detail by referring to the accompanying drawings.

Figure 1:
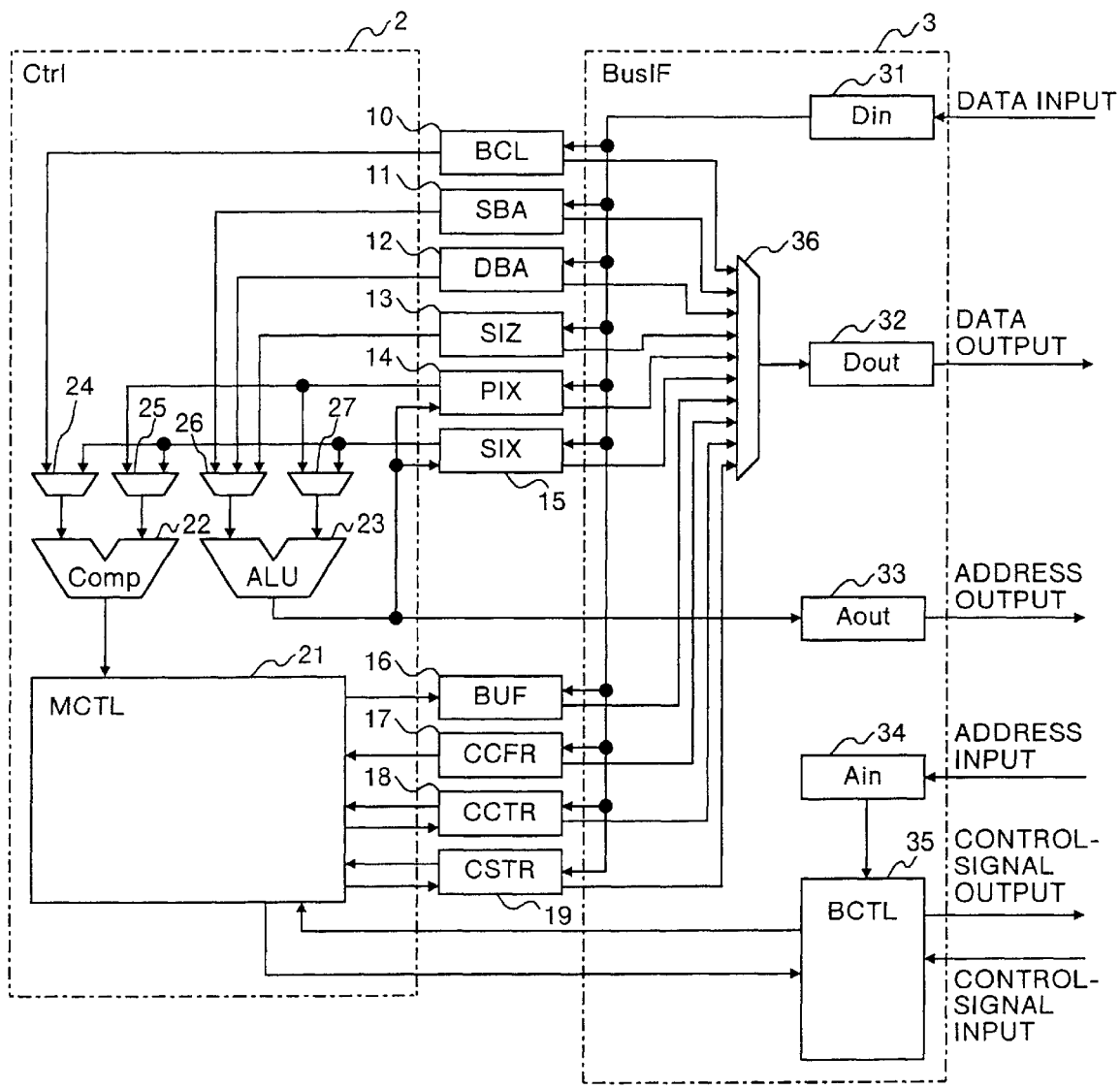
FIG. 1 is a block diagram showing a configuration of a direct memory access controller of the present invention.

FIG. 1 is a block diagram showing a configuration of a direct memory access controller of the present invention. The direct memory access controller is provided with 10 registers 10, 11, 12, 13, 14, 15, 16, 17, 18, and 19, a control section (Ctrl) 2, and a bus interface section (Bus IF) 3.

The BCL register 10 stores a value that indicates a total amount of transferred data. When a not-shown ring buffer serves as a transfer destination or a transfer source, the size of an area assigned to the ring buffer in a memory area is stored in the BCL register 10. The SBA register 11 is a register which stores the base address of the transfer source. When the ring buffer serves as the transfer source, the base address of a memory area assigned to the ring buffer is stored in the SBA register 11. The DBA register 12 is a register which stores the base address of the transfer destination. When the ring buffer serves as the transfer destination, the base address of a memory area assigned to the ring buffer is stored in the DAB register 12. The SIZ register 13 stores the amount of data read or written by one-time bus operation.

The PIX register 14 stores a position from which data is read at the next time as an offset (displacement value) from the base address of the transfer source stored in the SBA register 11. When the ring buffer serves as the transfer source, the position of data to be read at the next time in the ring buffer is stored in the PIX register 14 as the offset from the base address of the ring buffer stored in the SBA register 11. However, when the ring buffer serves as the transfer destination, a position in which data is written at the next time in the ring buffer is stored in the PIX register 14 as the offset from the base address of the ring buffer stored in the DBA register 12.

The SIX register 15 stores a position in which data is written at the next time as the offset from the base address of the transfer destination stored in the DBA register 12. However, when either of the transfer source and transfer destination is the ring buffer, it is assumed that the ring buffer and a destination address to which data is transferred are fixed. Therefore, because the SIX register 15 becomes empty, a stop address for the direct memory access transfer operation is stored in the SIX register 15 as the offset from the base address of the ring buffer stored in the SBA register 11 or DBA register 12.

The BUF register 16 is a register serving as a data buffer for temporarily storing the data read from the transfer source until the data is written in the transfer destination. The CCFR register 17 is a register for setting an operation mode of the direct memory access controller or the like. The setting for using the ring buffer as the transfer source or transfer destination is performed by the CCFR register 17. The CCTR register 18 is a register for controlling start and stop of an operation of the direct memory access controller. The CSTR register 19 is a register for displaying the state of an operation of the direct memory access controller.

Moreover, the control section 2 is provided with a main sequencer (MCTL) 21, a comparator (Comp) 22, an operational circuit (ALU) 23, and four selectors 24, 25, 26, and 27. The main sequencer 21 generates signals for controlling sections of the direct memory access controller. The comparator 22 performs the following three comparison operations. Firstly, when neither transfer source nor transfer destination is a ring buffer, the comparator 22 compares a value stored in the BCL register 10 with a value stored in the SIX register 15 and detects that transfer of the designated amount of data is completed.

Secondly, when a transfer source or a transfer destination is a ring buffer, the comparator 22 compares a value stored in the BCL register 10 with a value stored in the PIX register 14 and detects reaching the tail of a memory area assigned to the ring buffer. Thirdly, when the transfer source or transfer destination is the ring buffer, the comparator 22 compares the value stored in the PIX register 14 with the value stored in the value stored in the SIX register 15 and detects reaching the stop address.

The operational circuit 23 is a circuit for calculating addresses used for transfer and performs the following operation in accordance with a designation from the main sequencer 21. To obtain the address of the read position of the data read from a transfer source, the main sequencer 21 performs the operation for adding the value stored in the PIX register 14 to the value stored in the SBA register 11. To obtain the address of a data write position when a transfer destination is a ring buffer, the operation of adding the value stored in the PIX register 14 to the value stored in the DBA register 12 is performed. To obtain the address of the data write position when the transfer destination is other than the ring buffer, the operation of adding the value stored in the SIX register 15 to the value stored in the DBA register 12 is performed.

The above three operations are performed when an area for storing the data to be transferred is formed in the direction in which an address value increases from a base address. However, when the area for storing the data to be transferred is formed in the direction in which an address value decreases from the base address, the following three operations are performed instead of the above three operations. That is, to obtain the address of the read position of the data to be read from a transfer source, the operation of subtracting the value stored in the PIX register 14 from the value stored in the SBA register 11 is performed. To obtain the data write position when a transfer destination is a ring buffer, the operation of subtracting the value stored in the PIX register 14 from the value stored in the DBA register 12 is performed. To obtain the address of the data write position when the transfer destination is other than the ring buffer, the operation of subtracting the value stored in the SIX register 15 from the value stored in the DBA register 12 is performed.

To obtain the address of the read position of the data to be read from the transfer source when it is fixed, the operation of adding zero to the value stored in the SBA register 11 is performed. To obtain the address of the data write position when the transfer destination is fixed, the operation of adding zero to the value stored in the DBA register 12 is performed. To obtain a new offset at the transfer destination when a new offset at the transfer source or the transfer destination is a ring buffer, the operation of adding the value stored in the SIZ register 13 to the value stored in the PIX register 14 is performed. To obtain a new offset when the transfer destination is other than the ring buffer, the operation of adding the value stored in the SIZ register 13 to the value stored in the SIX register 15 is performed.

The first selector 24 selects either of the value stored in the BCL register 10 and the value stored in the SIX register 15 and supplies the selected value to the comparator 22. The second selector 25 selects either of the value stored in the PIX register 14 and the value stored in the SIX register 15 and supplies the selected value to the comparator 22. A comparison result by the comparator 22 is supplied to the main sequencer 21. The third selector 26 selects any one of the values stored in the SBA register 11, DBA register 12, and SIZ register 13 and supplies the selected value to the operational circuit 23.

The fourth selector 27 selects either of the value stored in the PIX register 14 and the value stored in the SIX register 15 and supplies the selected value to the operational circuit 23. An operation result by the operational circuit 23 is supplied to the PIX register 14, the SIX register 15, or an Aout register 33 set to a bus interface section 3 for temporarily storing an address output for the direct memory access transfer operation.

The bus interface section 3 is provided not only with the Aout register 33 but also with a Din register 31, a Dout register 32, an Ain register 34, a sequencer (BCTL) 35 for controlling the bus interface section 3, and a selector 36. The bus interface section 3 has a function for executing bus cycles for transfer in accordance with the control by the control section 2. In this case, it is assumed that the size of the data readable or writable by one bus cycle is any one of 1, 2, 4, 8, and 32 bytes. Moreover, it is assumed that a bus uses byte addressing and addresses used for bus cycles must be arranged on a natural boundary decided in accordance with the size of the data to be transferred. In this case, to transfer the data of 4 bytes, addresses used for bus cycles are restricted to multiples of 4.

The Din register 31 is a register for temporarily storing the write data for setting a register or the data read from a transfer source in accordance with the direct memory access transfer operation. The data stored in the Din register 31 is supplied to a corresponding register out of the BCL register 10, SBA register 11, DBA register 12, SIZ register 13, PIX register 14, SIX register 15, BUF register 16, CCFR register 17, CCRT register 18, and STR register 19. The Dout register 32 is a register for temporarily storing the data read from the BCD register 10, SBA register 11, DBA register 12, SIZ register 13, PIX register 14, SIX register 15, CCFR register17, CCTR register 18, or CSTR register 19 or the data read from the BUF register 16 and to be written in a transfer destination in accordance with the direct memory access transfer operation.

The Ain register 34 is a register for temporarily storing the value of an address used for the access when performing register setting or the like. The value of the address input from the Ain register 34 is supplied to the sequencer (BCTL) 35. The selector 36 selects any one of values stored in the BCL register 10, SBA register 11, DBA register 12, SIZ register 13, PIX register 14, SIX register 15, BUF register 16, CCFR register 17, CCTR register 18, and CSTR register 19 and supplies the selected value to the Dout register 32.

Figure 2:
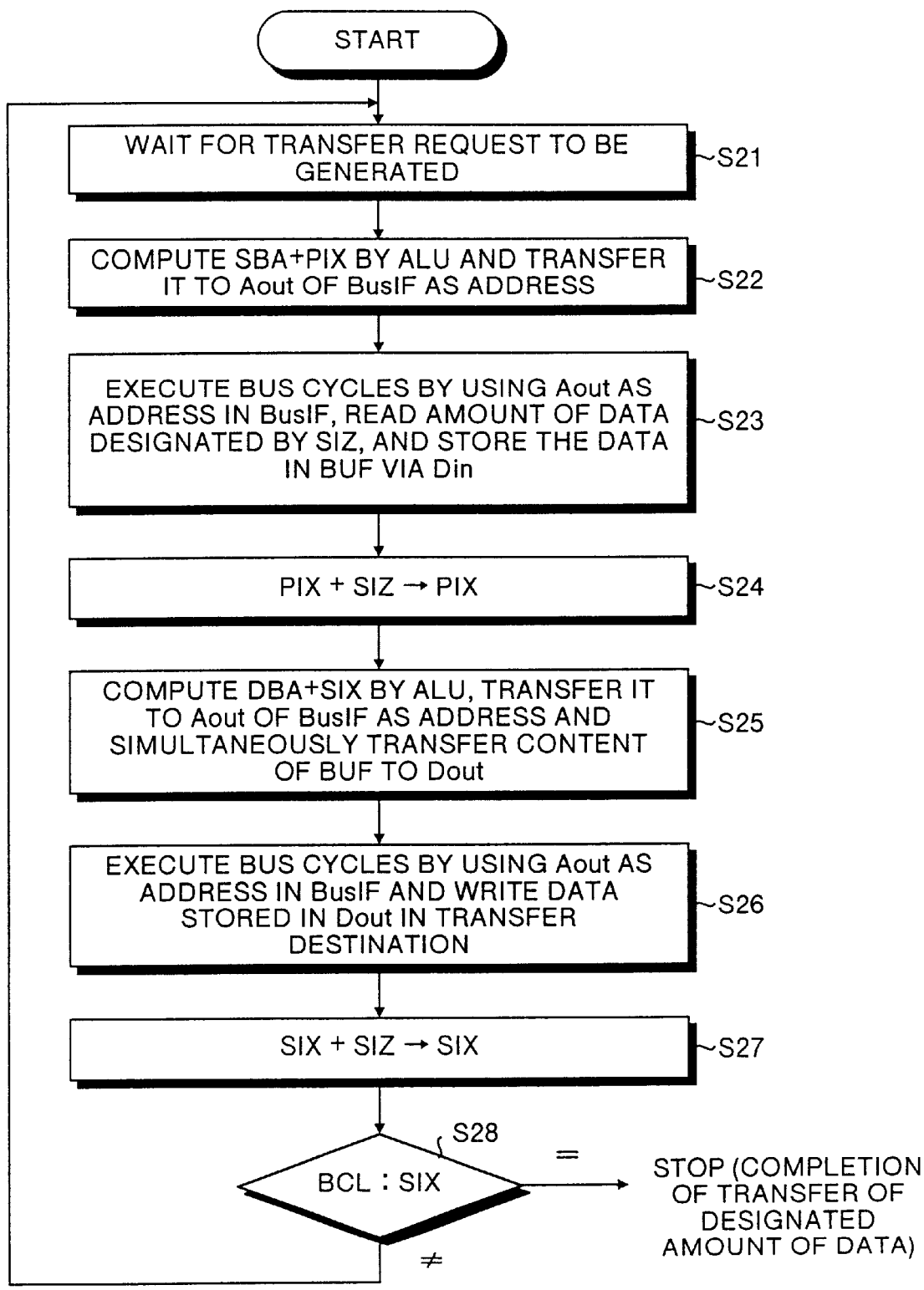
FIG. 2 is a flowchart showing a control procedure for transferring data from a certain area to another area in the normal operation of a direct memory access controller of the present invention.

Then, operations of the direct memory access controller having the configuration shown in FIG. 1 are described below. FIG. 2 is a flowchart showing the control procedure for transferring data from an area in which a memory is present to other area in the normal operation. After the direct memory access controller is started, it is brought into a state of waiting for a request for direct memory access transfer to be generated (step S21). When the request for direct memory access transfer is generated, the operational circuit 23 of the control section 2 adds the value stored in the PIX register 14 to the value stored in the SBA register 11 to obtain the address of the read position of the data to be read from a transfer source. The obtained address is transferred to and stored in the Aout register 33 of the bus interface section 3 (step S22).

The bus interface section 3 executes bus cycles by using the value stored in the Aout register 33 as an address, read the amount of data designated by the value stored in the SIZ register 13 from the transfer source and transfers the data to the BUF register 16 through the Din register 31. Then, the BUF register 16 stores the transferred data (step S23). The operational circuit 23 adds the value stored in the SIZ register 13 to the value stored in the PIX register 14 to obtain a new offset value of a read position. The new offset value is transferred to and stored in the PIZ register 14 (step S24).

Subsequently, the operational circuit 23 adds the value stored in the SIX register 15 to the value stored in the DBA register 12 to obtain the address of the write position of the data to be written in a transfer destination. The obtained address is transferred to and stored in the Aout register 33 of the bus interface section 3. At the same time, the data stored in the BUF register 16 is transferred to and stored in the Dout register 32 of the bus interface section 3 (step S25). The bus interface section 3 executes bus cycles by using the value stored in the Aout register 33 as an address and outputs the data stored in the Dout register 32 to the transfer destination. Thereby, the output data is written in the transfer destination (step S26). Then, the operational circuit 23 adds the value stored in the SIZ register 13 to the value stored in the SIX register 15 to obtain a new offset value of a write position. The new offset value is transferred to and stored in the SIX register 15 (step S27).

The new offset value stored in the SIX register 15 is compared with the value stored in the BCL register 10 by the comparator 22 of the control section 2 (step S28) As a result of the comparison, when the new offset value stored in the SIX register 15 is equal to the value stored in the BCL register 10, the direct memory access controller stops the transfer operation by determining that transfer of the designated amount of data is completed. However, when the new offset value is not equal to the value stored in the BCL register 10, the direct memory access controller returns to the direct-memory-access-transfer-request waiting state at step S21.

As explained in connection to FIG. 2, values of two registers are added at steps S22 and S25 when calculating addresses in order to execute bus cycles because the storage area of the data to be transferred is formed in the direction in which an address value increases from a base address. It is also possible to form the storage area of the data to be transferred in the direction in which an address value decreases from the base address. In this case, the operation of subtracting the value stored in the PIX register 14 from the value stored in the SBA register 11 is performed at step S22.

Similarly, at step S25, the operation of subtracting the value stored in the SIX register 15 from the value stored in the DBA register 12 is performed. Moreover, because the size for reading the transfer source and the size for writing data in the transfer destination are decided by the value stored in the SIZ register 13, it is possible to transfer data so that the order of the data is reversed by changing designations of "+(add)" and "−(subtract)" in the operation about the transfer source and the operation about the transfer destination. Thereby, it is possible to rearrange data similarly to the case of a conventional direct memory access controller.

Figure 3:
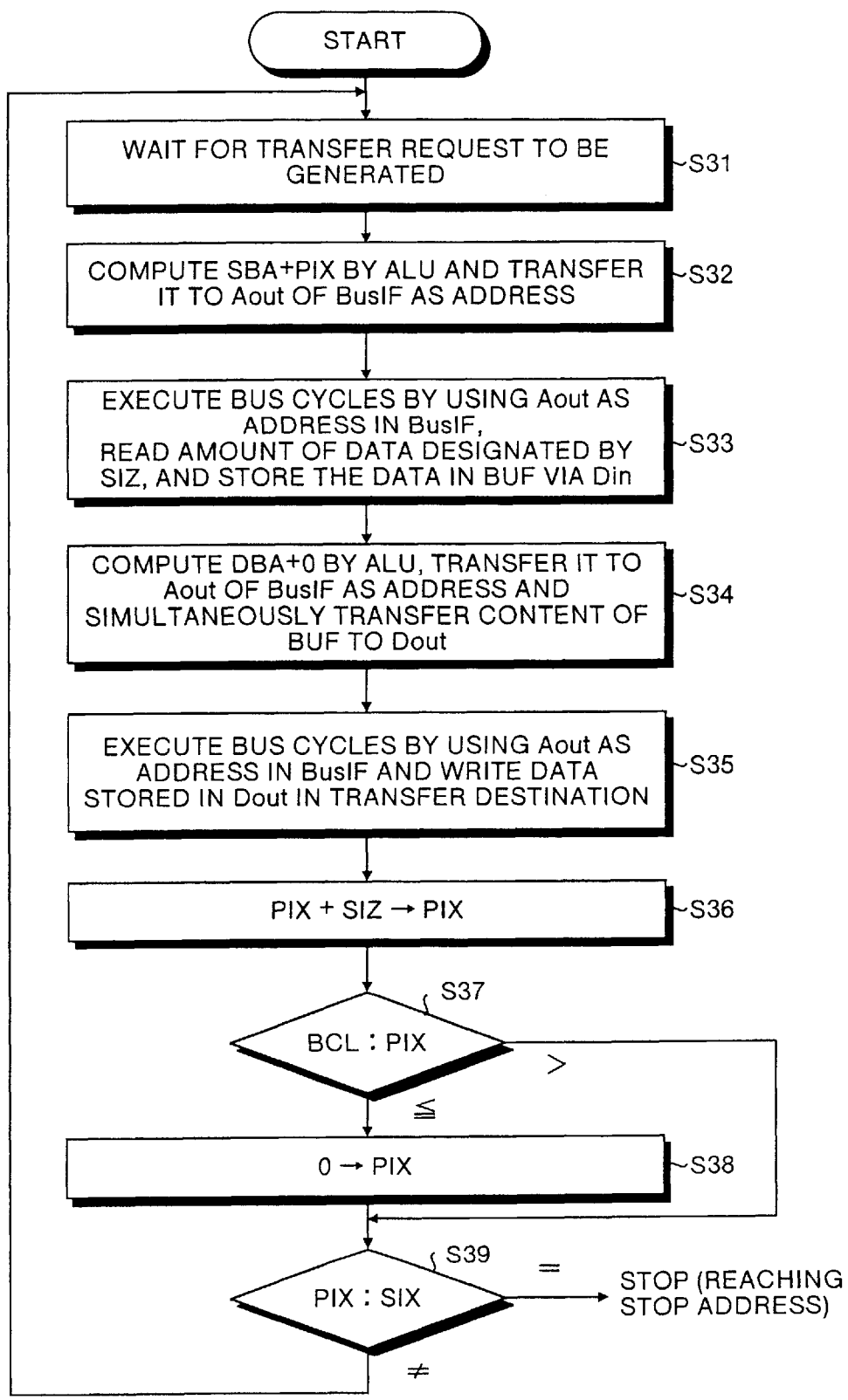
FIG. 3 is a flowchart showing a control procedure for transferring data when using the ring buffer of a direct memory access controller of the present invention as a transfer source.
Figure 4:
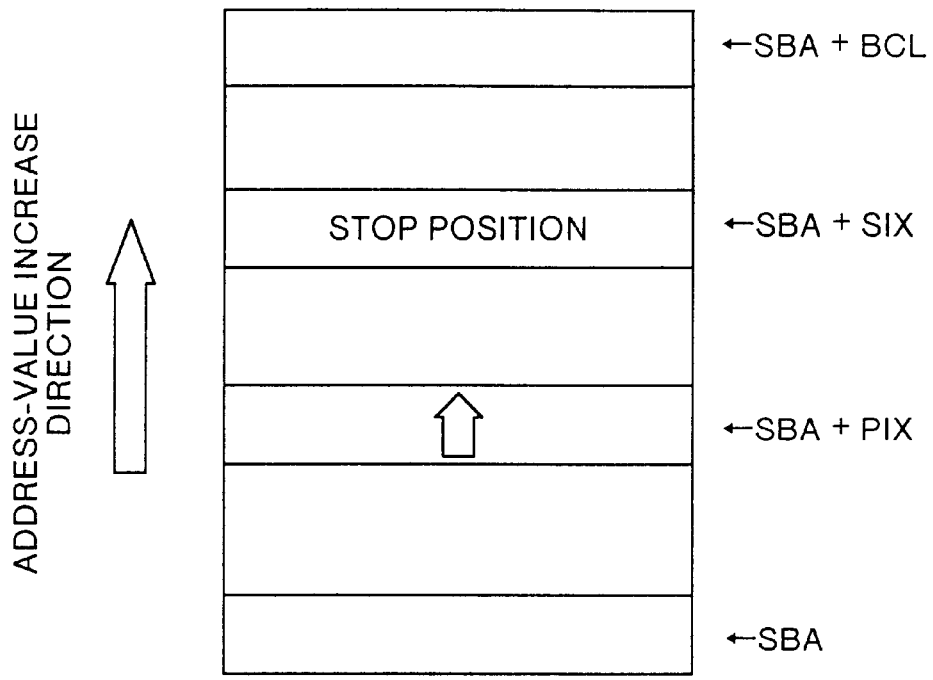
FIG. 4 is a memory map showing a structure of a memory area assigned as a ring buffer under the direct memory access transfer operation when using the ring buffer as a transfer source.

Then, operations of the direct memory access controller when a ring buffer is a transfer destination are described below. FIG. 3 is a flowchart showing a control procedure for transferring data from a ring buffer serving as a transfer source to other area or an output unit. FIG. 4 is a memory map showing a structure of a memory area assigned as a ring buffer for the direct memory access transfer operation when a ring buffer is a transfer source.

After the direct memory access controller is started, it is brought into a state for waiting for a direct-memory-access-transfer request to be generated (step S31). When the direct-memory-access-transfer request is generated, the operational circuit 23 adds the value stored in the PIX register 14 to the value stored in the SBA register 11 to obtain the address of the read position of the data read from a ring buffer. In this case, the value stored in the SBA register 11 is the base address of an area assigned to the ring buffer.

The value stored in the PIX register 14 is an offset value from he base address of the area assigned to the ring buffer at the data read position. The obtained address is transferred to and stored in the Aout register 33 (step S32). The bus interface section 3 executes bus cycles by using the value stored in the Aout register 33 as an address, reads the amount of data designated by the value stored in the SIZ register 13 from the ring buffer, and transfers the data to the BUF register 16 through the Din register 31. Moreover, the BUF register 16 stores the transferred data (step S33).

Then, the operational circuit 23 adds zero to the value stored in the DBA register 12 to obtain the address of the write position of the data to be written in a transfer destination. The obtained address is transferred to and stored in the Aout register 33. At the same time, the data stored in the BUF register 16 is transferred to and stored in the Dout register 32 (step S34). The bus interface section 3 executes bus cycles by using the value stored in the Aout register 33 as an address and outputs the data stored in the Dout register 32 to the transfer destination. Thereby, the output data is written in the transfer destination (step S35). Moreover, the operational circuit 23 adds the value stored in the SIZ register 13 to the value stored in the PIX register 14 to obtain an new offset value of a read position. The new offset value is transferred to and stored in the PIX register 14 (step S36).

The new offset value stored in the PIX register 14 is compared with the value stored in the BCL register 10 by the comparator 22 (step S37). The value stored in the BCL register 10 corresponds to the size of an area assigned to the ring buffer. Therefore, as a result of the above comparison, when the value stored in the PIX register 14 becomes equal to or more than the value stored in the BCL register 10, reaching the tail of the ring buffer is determined and the offset value of the PIX register 14 is returned to zero (step S38). Thereby, it is possible to circulatively access an area from the base address of the area assigned to the ring buffer up to the address obtained by adding the value stored in the BCL register 10 to the value stored in the SBA register 11, that is, the area assigned to the ring buffer and transfer data.

However, until the value stored in the PIX register 14 reaches the value stored in the BCL register 10, the value stored in the PIX register 14 is compared with the value stored in the SIX register 15 by the comparator 22 (step S39). In this case, the value stored in the SIX register 15 is a value showing the position in which a process for writing data in the ring buffer writes data at the next time, that is, a value showing the position at which the direct memory access controller stops the transfer operation using the ring buffer as a transfer source.

Therefore, as a result of the above comparison, when the new offset value stored in the PIX register 14 is equal to the value stored in the SIX register 15, the direct memory access controller determines reaching the stop address and stops the data transfer operation. The fact that the new offset value coincides with the stop address denotes that the ring buffer is empty. However, when the new offset value is not equal to the value stored in the SIX register 15, the direct memory access controller determines not reaching the stop address and returns to the direct-memory-access-transfer-request generation waiting state at step S31.

FIG. 3 and FIG. 4 show the case in which the storage area of the data to be transferred is formed in the direction in which an address value increases from a base address. However, it is also possible to form the storage area of the data to be transferred in the direction in which an address value decreases from the base address. In this case, at step S32 in FIG. 3, the operation of subtracting the value stored in the PIX register 14 from the value stored in the SBA register 11 is performed.

Figure 5:
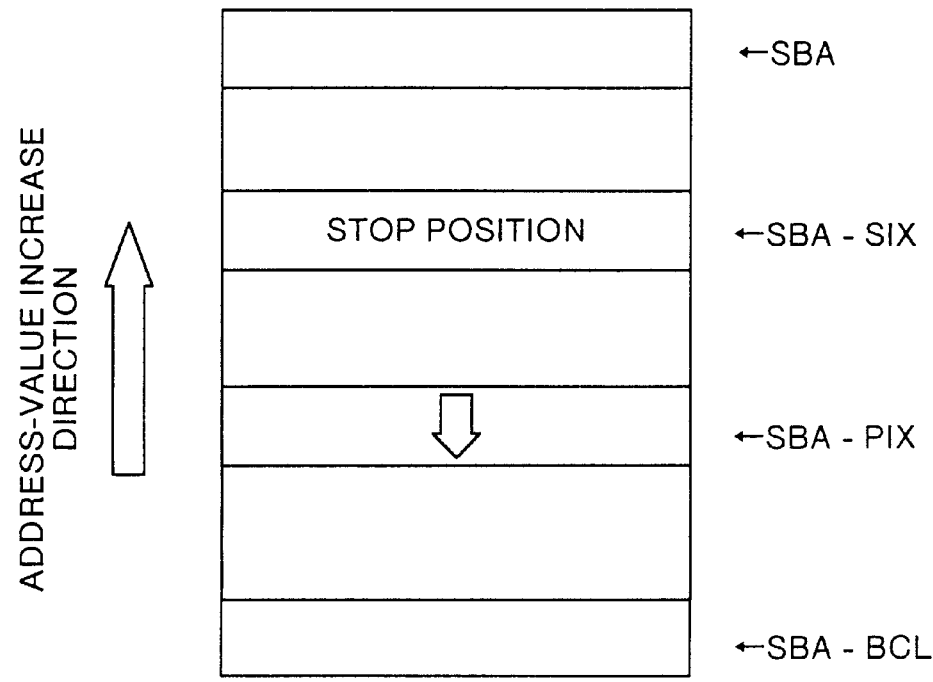
FIG. 5 is a memory map showing another structure of a memory area assigned as a ring buffer under the direct memory access transfer operation when using the ring buffer as a transfer source.

FIG. 5 shows a memory map showing a structure of a memory area assigned as a ring buffer in the above case. The area assigned to the ring buffer ranges between the base address stored in the SBA register 11 and the address obtained by subtracting the value stored in the BCL register 10 from the value stored in the SBA register 11. Moreover, it is possible to circulatively access the area ranging between them and transfer data. Moreover, it is possible to transfer data so that the data order is reversed by changing designations of "+(add)" and "−(subtract)" in the operation relating to a transfer source and the operation relating to a transfer destination.

Figure 6:
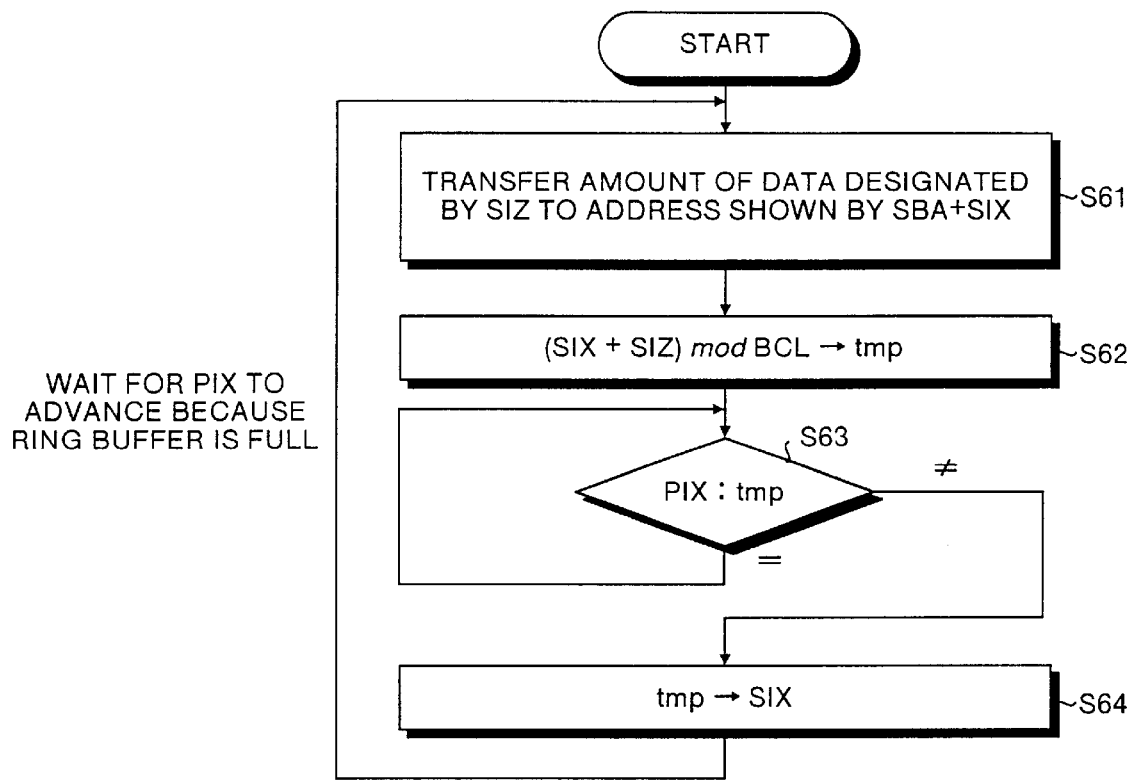
FIG. 6 is a flowchart showing a procedure for writing data in a ring buffer by a CPU when a direct memory access controller operates by using a ring buffer as a transfer source.

When the direct memory access controller operates by using a ring buffer as a transfer source, a CPU writes processed data in the ring buffer in accordance with the next procedure simultaneously with the operation of the controller. FIG. 6 is a flowchart showing a procedure for writing data in a ring buffer by a CPU when the direct memory access controller operates by using a ring buffer as a transfer source. When the CPU starts writing data in the ring buffer, it first adds the value stored in the SIX register 15 (stop address) to the value stored in the SBA register 11 (that is, base address of ring buffer) to obtain the address of the write position of the data to be written in the ring buffer. The CPU transfers the amount of data designated by the value stored in the SIZ register 13 to the position designated by the address (step S61).

Then, the CPU adds the value stored in the SIZ register 13 to the value stored in the SIX register 15 to compute remainders of the addition result and the value stored in the BCL register 10. The value obtained by computing the remainders is stored in a tmp register of the CPU for temporarily storing data (step S62). Then, the CPU compares the value stored in the PIX register 14 with the value stored in the tmp register (step S63). When the values coincide with each other, the ring buffer is full. Therefore, the CPU waits until the value stored in the PIX register 14 is advanced in accordance with the transfer operation of the direct memory access controller. When the value stored in the PIX register 14 is advanced, the CPU stores the value stored in the tmp register in the SIX register 15 (step S64) and returns to step S61.

Figure 7:
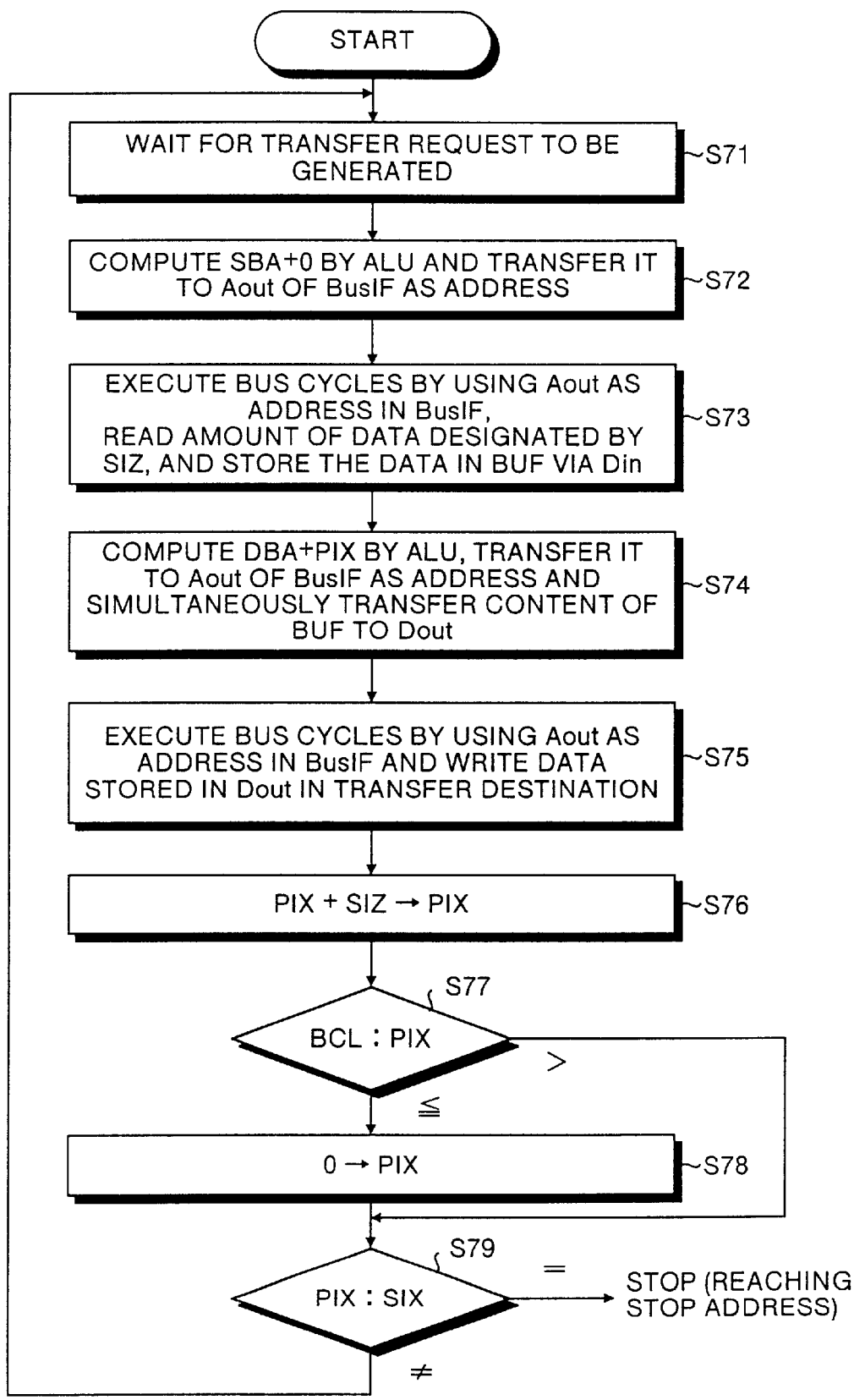
FIG. 7 is a flowchart showing a procedure for controlling transfer of data when using a ring buffer of a direct memory access controller of the present invention as a transfer destination.
Figure 8:
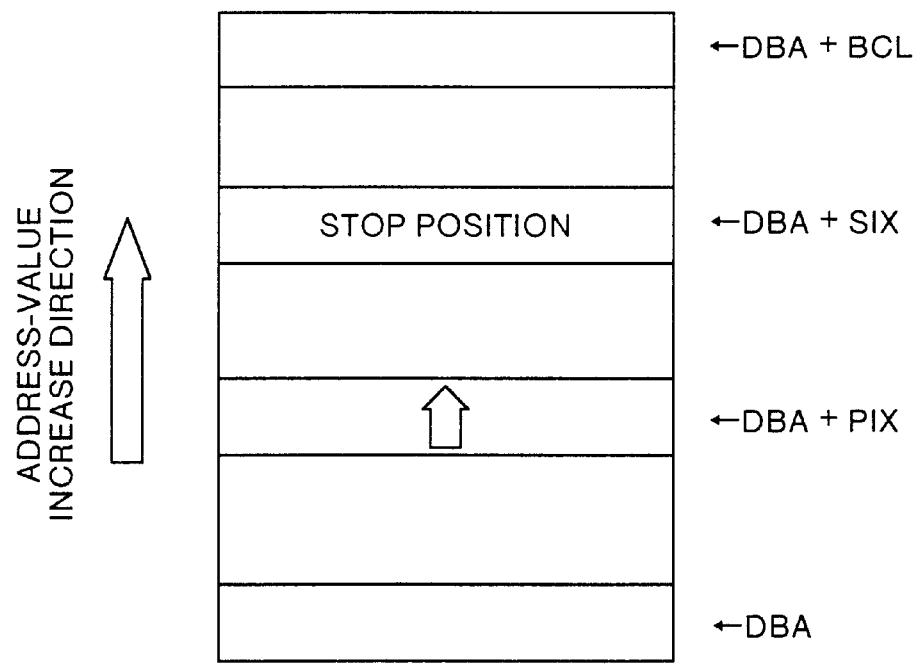
FIG. 8 is a memory map showing a structure of a memory area assigned as a ring buffer under the direct memory access transfer operation when using a ring buffer as a transfer destination.

Then, operations of the direct memory access controller when a ring buffer is a transfer destination are described below. FIG. 7 is a flowchart showing a control procedure for transferring data from other area in a memory or from an input apparatus to the ring buffer serving as the transfer destination. FIG. 8 is a memory map showing a structure of a memory area assigned as a ring buffer under the direct memory access transfer operation when the ring buffer is a transfer destination.

After the direct memory access controller is started, it is brought into a state for waiting for a direct-memory-access-transfer request to be generated (step S71). When the direct-memory-access-transfer request is generated, the operational circuit 23 adds zero to the value stored in the SBA register 11 and transfers the value to the Aout register 33 as the address of the data to be read from a transfer destination. The transferred value is stored in the Aout register 33 (step S72). The bus interface section 3 executes bus cycles by using the value stored in the Aout register 33 as an address, read the amount of data designated by the value stored in the SIZ register 13 from the transfer destination, and transfers the data to the BUF register 16 through the Din register 31. Moreover, the BUF register 16 stores the transferred data (step S73).

Then, the operational circuit 23 adds the value stored in the PIX register 14 to the value stored in the DBA register 12 to obtain the address of the write position of the data to be written in the ring buffer. In this case, the value stored in the DBA register 12 is the base address of the area assigned to the ring buffer. The value stored in the PIX register 14 is an offset value from the base address of the area assigned to the ring buffer. The obtained address is transferred to and stored in the Aout register 33. At the same time, the data stored in the BUF register 16 is transferred to and stored in the Dout register 32 (step S74)

The bus interface section 3 executes bus cycles by using the value stored in the Aout register 33 as an address and outputs the data stored in the Dout register 32 to the ring buffer. Thereby, the output data is written in the ring buffer (step S75). Then, the operational circuit 23 adds the value stored in the SIZ register 13 to the value stored in the PIX register 14 to obtain a new offset value of a write position. The new offset value is transferred to and stored in the PIX register 14 (step S76).

The new offset value stored in the PIX register 14 is compared with the value stored in the BCL register 10 by the comparator 22 (step S77). As a result of the comparison, when the value stored in the PIX register 14 becomes equal to or more than the value stored in the BCL register 10, reaching the tail of the ring buffer is determined and the offset value of the PIX register 14 is returned to zero (step S78). Thereby, it is possible to circulatively access the area from the base address of the area assigned to the ring buffer up to the address obtained by adding the value stored in the BCL register 10 to the value stored in the DBA register 12, that is, the area assigned to the ring buffer and transfer data.

However, until the value stored in the PIX register 14 reaches the value stored in the BCL register 10, the value stored in the PIX register 14 is compared with the value stored in the SIX register 15 by the comparator 22 (step S79). In this case, the value stored in the SIX register 15 is a value showing the position at which a process for reading data from the ring buffer and processing the data reads data at the next time, that is, a value showing the position at which the direct memory access controller stops the transfer operation using the ring buffer as a transfer destination.

Therefore, as a result of the above comparison, when the new offset value stored in the PIX register 14 is equal to the value stored in the SIX register 15, the direct memory access controller determines reaching the stop address and stop the data transfer operation. The fact that the new offset value coincides with the stop address denotes that the ring buffer is full. However, when the new offset value is not equal to the value stored in the SIX register 15, the direct memory access controller determines not reaching the stop address and returns to the direct-memory-access-transfer-request-generation waiting state at step S71.

FIG. 7 and FIG. 8 show the case in which the storage area of the data to be transferred is formed in the direction in which an address value increases from a base address. However, it is also possible to form the storage area of the data to be transferred in the direction in which an address value decreases from the base address. In this case, at step S74 in FIG. 7, the operation of subtracting the value stored in the PIX register 14 from the value stored in the DBA register 12 is performed.

Figure 9:
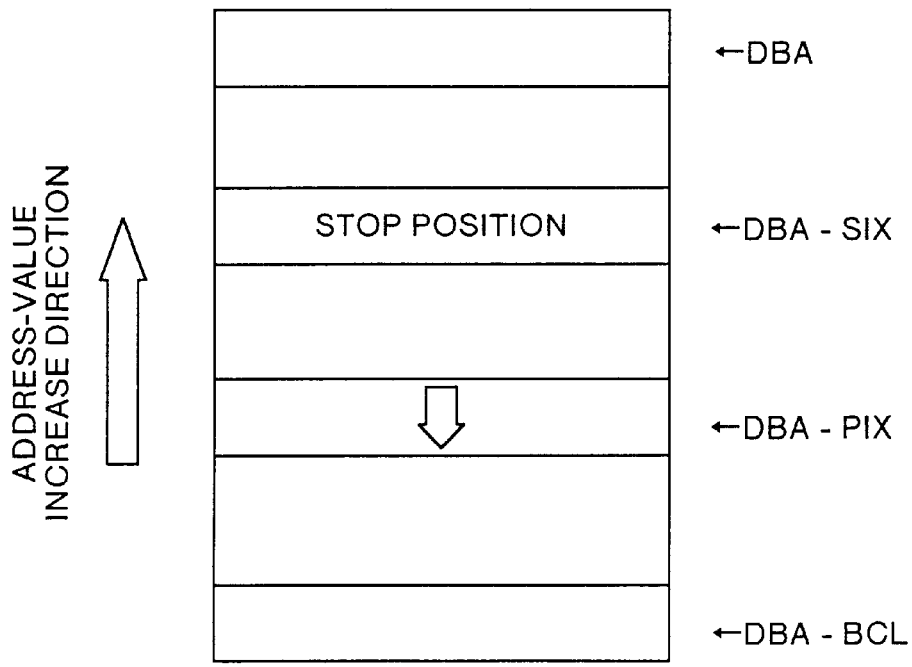
FIG. 9 is a memory map showing another structure of a memory area assigned as a ring buffer under the direct memory access transfer operation when using a ring buffer as a transfer destination.

FIG. 9 shows a memory map showing a structure of a memory area assigned as a ring buffer in the above case and the area assigned to the ring buffer ranges between the base address stored in the DBA register 12 and the address obtained by subtracting the value stored in the BCL register 10 from the value stored in the DBA register 12. Moreover, it is possible to circulatively access the area between them and transfer data. Furthermore, it is a matter of course that data can be transferred so that the data order is revered by changing designations of "+(add)" and "−(subtract)" in the operation relating to a transfer source and the operation relating to a transfer destination.

Figure 10:
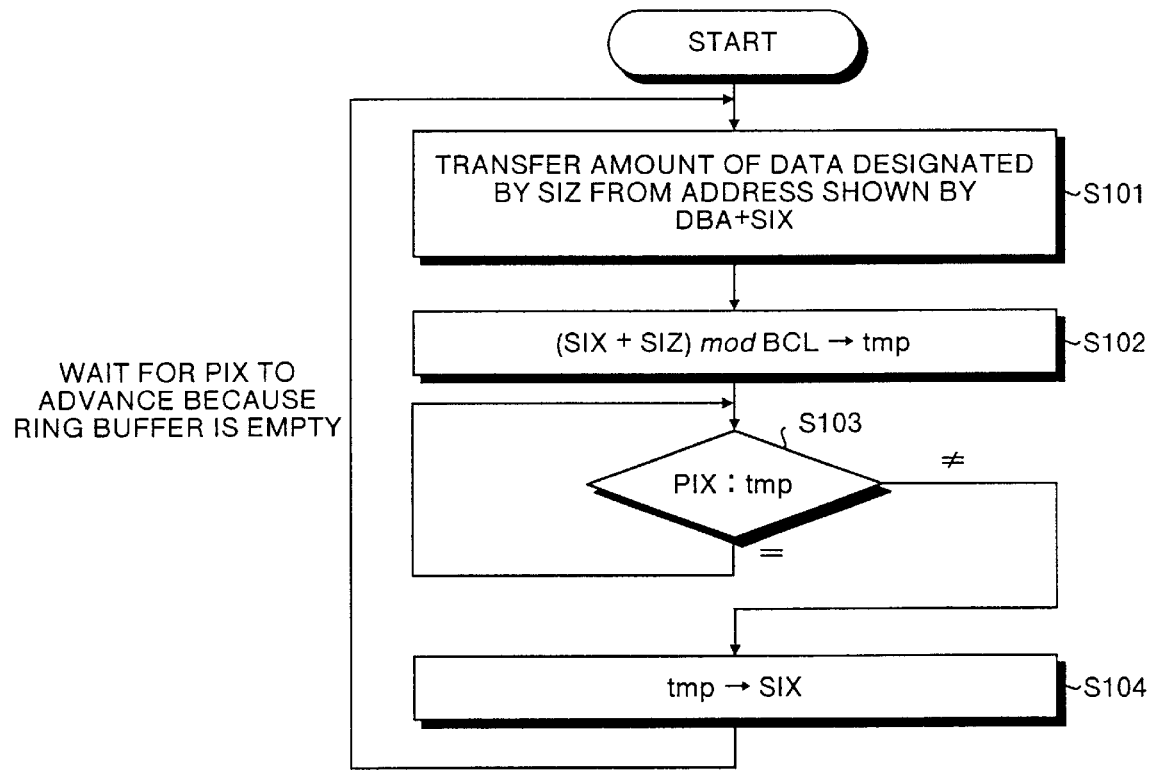
FIG. 10 is a flowchart showing a procedure for reading data from a ring buffer by a CPU when a direct memory access controller operates by using a ring buffer as a transfer destination.

When the direct memory access controller operates by suing the ring buffer as the transfer destination, the CPU reads data from the ring buffer in accordance with the following procedure simultaneously with the operation of the controller. FIG. 10 is a flowchart showing a procedure for reading data from a ring buffer by a CPU when the direct memory access controller operates by using the ring buffer as a transfer destination. When the CPU starts reading data from the ring buffer, it first adds the value (stop address) stored in the SIX register 15 to the value (that is, base address of ring buffer) stored in the DBA register 12 to obtain the address of the read position of the data to be read from the ring buffer. The CPU reads the amount of data designated by the value stored in the SIZ register 13 from the position designated by the address and transfers the data (step S101).

The CPU adds the value stored in the SIZ register 13 to the value stored in the SIX register 15 to compute remainders of the addition result and the value stored in the BCL register 10. The value obtained by computing the remainders is stored in a tmp register of the CPU for temporarily storing data (step S102). Then, the CPU compares the value stored in the PIX register 14 with the value stored in the tmp register (step S103). When these values coincides with each other, the ring buffer is empty. Therefore, the CPU waits until the value stored in the PIX register 14 is advanced in accordance with the transfer operation of the direct memory access controller. When the value stored in the PIX register 14 is advanced, the CPU stores the value stored in the tmp register in the SIX register 15 (step S104) and returns to step S101.

According to the first embodiment, when performing direct memory access transfer by using a ring buffer as a transfer source or transfer destination, data read position or data write position is decided by the base address of the ring buffer and the offset from the base address. The offset is updated by the amount of data transferred through the direct memory access transfer operation and when it becomes equal to or more than the value that indicates a total amount of transferred data, it is reset to zero. Therefore, an address is generated so as to make an access by circulating between the base address of the ring buffer and the address decided by the base address and the value that indicates a total amount of transferred data. Therefore, it is possible to freely select the address and size of an area to be assigned to a ring buffer compared to the conventional of generating a circulative address for a ring buffer by suppressing the carry from a low-order bit to a high-order bit for address calculation.

Moreover, according to the first embodiment, it is possible to decrease the size of a circuit because a register for holding an initial value is unnecessary compared to the conventional of generating a circulative address for a ring buffer by setting the initial value to an address register again when reaching the tail of the ring buffer. Moreover, when the upper limit of the total amount of data that can be transferred is smaller than the size of an address space like the case of a system having a 32-bit address and having 16 bits as the upper limit of the total amount of data that can be transferred, it is possible to reduce the number of bits of the BCL register 10, PIX register 14, or SIX register 15 and thereby, decrease the size of a circuit.

Furthermore, according to the first invention, an offset showing the read position or write position of a ring buffer is updated by the amount of data transferred through the direct memory access transfer operation while a stop address is updated by the amount of data read or written by a CPU or the like without depending on the direct memory access transfer operation. Therefore, no dependent relation occurs between update timings of the addresses. Therefore, it is possible to free an area occupied by the processed data in a ring buffer without stopping the transfer operation of the direct memory access controller and thereby, prevent the transfer capacity of direct memory access from deteriorating. Moreover, because it is unnecessary to form an extra data structure such as a graph in a memory area used as a ring buffer, it is possible to reduce the memory capacity required to access the ring buffer.

Figure 11:
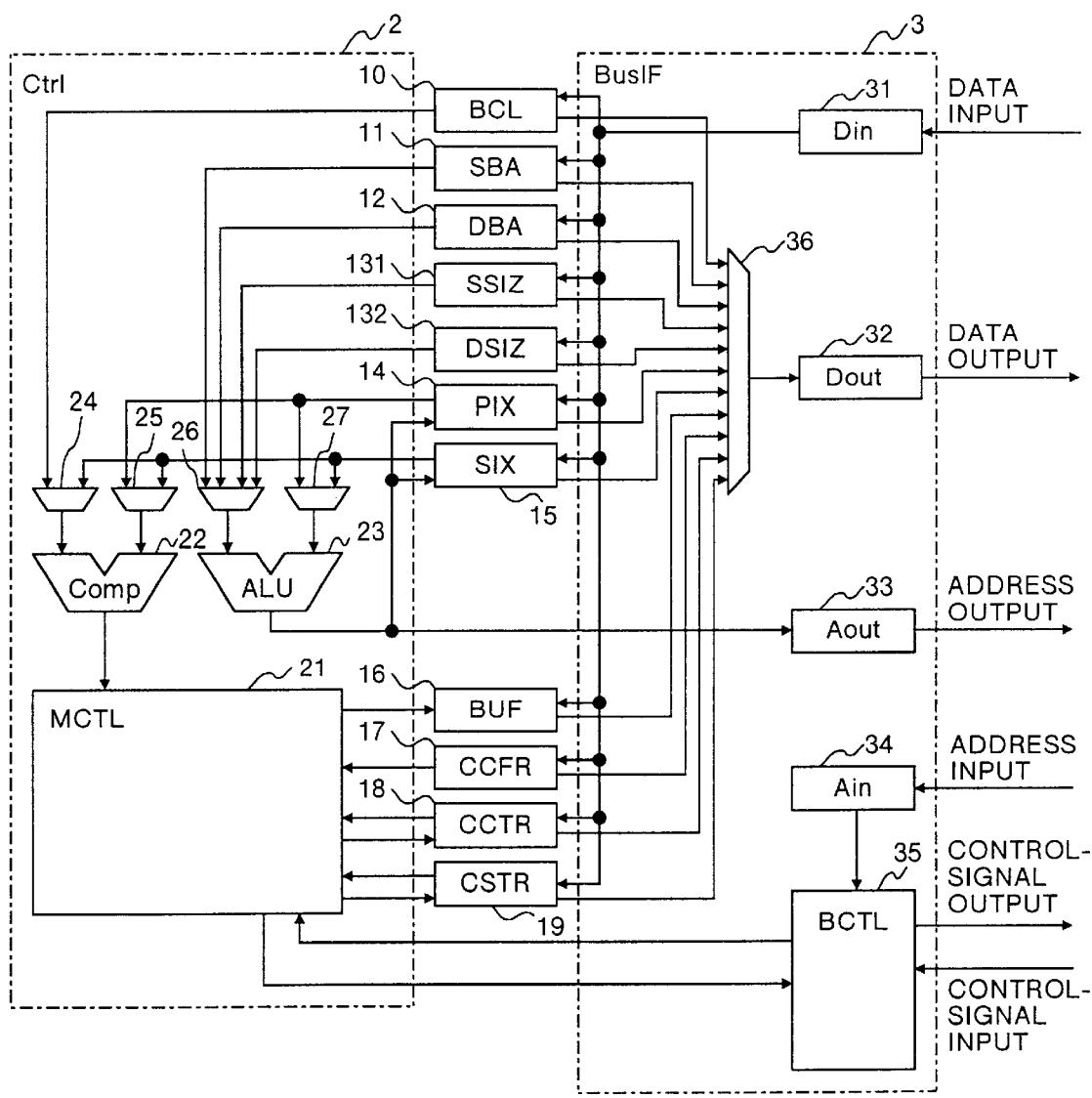
FIG. 11 is a block diagram showing another configuration of a direct memory access controller of the present invention.

FIG. 11 is a block diagram showing a configuration of a direct memory access controller according to a second embodiment of the present invention. The direct memory access controller of the second embodiment uses a direct memory access controller having the configuration shown in FIG. 1, in which an SSIZ register 131 and a DSIZ register 132 are used instead of the SIZ register 13. That is, the second embodiment is constituted by dividing the SIZ register 13 into the SSIZ register 131 for a transfer source and the DSIZ register 132 for a transfer destination.

The SSIZ register 131 stores the amount of data to be read by one-time bus operation. The DSIZ register 132 stores the amount of data to be written by one-time bus operation. In the case of the second embodiment, it is possible to set the unit amount of data to be read from a transfer source decided by the SSIZ register 131 and the unit amount of data to be written in a transfer destination decided by the DSIZ register 132 so as to be different from each other. Because other configurations of the second embodiment are the same as those of the first embodiment, a configuration same as that of the first embodiment is provided with the same symbol and its description is omitted.

When the amount of data designated by the DSIZ register 132 is larger than the amount of data designated by the SSIZ register 131, the direct memory access controller performs the packing operation for the transfer operation from a transfer source to a transfer destination. In the packing operation, the direct memory access controller repeatedly read data by the times obtained from (amount of data designated by DSIZ register 132) (amount of data designated by SSIZ register 131), unites each obtained data into the amount of data designated by the DSIZ register 132 by using the BUF register 16, and then writes the data in a transfer destination by one-time transfer.

Moreover, when the amount of data designated by the SSIZ register 131 is larger than the mount of data designated by the DSIZ register 132, the direct memory access controller performs the unpacking operation for the transfer operation from a transfer source to a transfer destination. In the unpacking operation, the direct memory access controller reads the amount of data designated by the SSIZ register 131 from a transfer destination, stores the data in the BUF register 16, and repeatedly writes the data in the transfer destination by dividing the data into the times obtained from (amount of data designated by SSIZ register 131)/(amount of data designated by DSIZ register 132). Therefore, in the case of the second embodiment, the BUF register 16 is also used as a work area for performing the packing operation or unpacking operation.

For example, the unit transfer amount of data of a transfer source designated by the SSIZ register 131 is assumed as $2^s$ and the unit transfer amount of data of the transfer source designated by the DSIZ register 132 is assumed as $2^d$. In this case, d and s are integers. When d is larger than s, read of data from the transfer source is repeated up to $2^{(d-s)}$ times and the data thereby obtained is united into one data value and simultaneously written in the transfer source (packing operation). When s is larger than d, the data read from the transfer source by one time is divided into $2^{(s-d)}$ small data values and repeatedly written in the transfer source (unpacking operation).

In this case, the position at which the direct memory access controller stops the transfer operation using a ring buffer as a transfer source or transfer destination is shown by the value stored in the SIX register 15. Therefore, when a new offset value updated by the transfer operation of the direct memory access controller and stored in the PIX register 14 coincides with the value (stop address) stored in the SIX register 15, the direct memory access controller stops the transfer operation (refer to FIG. 3 or FIG. 7).

The value stored in the PIX register 14 is compared with the value stored in the SIX register 15 in order to determine whether to stop the transfer operation of the direct memory access controller by using low-order s bits as a mask when the controller uses a ring buffer as a transfer source and by using low-order d bits as a mask when the controller uses the ring buffer as a transfer destination.

According to the second embodiment, even when the unit amount of data read by one-time bus operation is different from the unit amount of data written by one-time bus operation, the same advantage as the case of the first embodiment is obtained. Moreover, according to the second embodiment, it is possible to obtain a larger transfer capacity by using a memory directed toward read or write every amount of data collected to a certain extent like the case of an SDRAM as a transfer source or transfer destination.

The present invention is not limited only to the above-explained embodiments. The direct memory access control method of each of the above-explained embodiments can use a prepared computer-readable program and is realized by executing the program by a personal computer or a computer such as a workstation. The program is recorded in a computer-readable recording medium such as an HD (hard disk) FD (floppy disk), CR-ROM, MO, or DVD and executed by being read from a recording medium by a computer. Moreover, the program may be a transmission medium that can be distributed through a network such as Internet.

According to the present invention, when performing the direct memory access transfer by using a ring buffer as a transfer source or transfer destination, the read position or write position of data is decided by the base address of the ring buffer and the offset from the base address, and the offset is updated by the amount of data transferred through the direct memory access transfer operation and reset to zero when the offset becomes equal to or more than the value that indicates a total amount of transferred data. Therefore, an address is generated so as to make an access by circulating between the base address of the ring buffer and the address decided by the base address and the value that indicates a total amount of transferred data. Therefore, it is possible to select the address and size of an area to be assigned to a ring buffer more freely than ever and further decrease the size of a circuit than ever.

Moreover, an offset showing the read position or write position of a ring buffer is updated by the amount of data transferred through the direct memory access transfer operation and a stop address is updated by the amount of data read or written by a CPU or the like without depending on the direct memory access transfer operation. Therefore, no dependent relation occurs between update timings of the addresses. Therefore, it is possible to prevent the transfer capacity of direct memory access from deteriorating and a graph or the like showing an empty area of a ring buffer is unnecessary. Therefore, it is possible to reduce the memory capacity required to access the ring buffer.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A direct memory access controller comprising:
   a first register which stores the base address of a transfer-source area;
   a second register which stores the base address of a transfer-destination area;
   a third register which stores a data read position in the transfer-source area as the offset from the base address stored in said first register;
   a fourth register which stores a data write position in the transfer-destination area as the offset from the base address stored in said second register;
   a fifth register which stores a value that indicates a total amount of transferred data; and
   a control section which provides a control for repeating an operations for reading data from a transfer-destination address decided in accordance with the data stored in said first register and said third register, writing the read data in a transfer-destination address decided in accordance with the data stored in said second register and said fourth register, and updating the data stored in said third register and said fourth register by the transferred amount of data until the data stored in said fourth register coincides with the data stored in said fifth register.

2. The direct memory access controller according to claim 1, further comprising:
   a sixth register which stores the unit amount of data read by one-time bus operation;
   a seventh register which stores the unit amount of data written by one-time bus operation; and
   an eighth register used as a work area; wherein
   said control section repeatedly reads data from a transfer source a plurality of times when the amount of data designated by the data stored in said seventh register is larger than the amount of data designated by the data stored in said sixth register, unites each obtained data into the amount of data designated by the data stored in said seventh register by using said eighth register, and writes the united data in a transfer destination by one-time write operation.

3. The direct memory access controller according to claim 1, further comprising:
   a sixth register which stores the unit amount of data read by one-time bus operation;
   a seventh register which stores the unit amount of data written by one-time bus operation; and
   an eighth register used as a work area; wherein
   said control section reads the amount of data designated by the data stored in said sixth register from a transfer source by one-time read operation when the amount of data designated by the data stored in said sixth register is larger than the amount of data designated by the data stored in said seventh register, temporarily stores the obtained data in said eighth register, and writes the data stored in said eighth register in a transfer destination by a plurality of times of write operations.

4. A direct memory access controller comprising:
   a first register which stores the base address of a transfer-source area;
   a second register which stores the fixed address of a transfer-destination area;
   a third register which stores a data read position in the transfer-source area as the offset from the base address stored in said first register;
   a fourth register which stores a write position when a process for writing data in a transfer destination writes data in the same transfer source at the next time as an offset from the base address stored in said first register;
   a fifth register which stores a value that indicates a total amount of transferred data; and
   a control section which provides a control for repeating an operations for reading data from a transfer-destination address decided in accordance with the data stored in said first register and said third register, writing the read data in a transfer-destination address represented by the data stored in said second register, updating the data stored in said third register by the amount of transferred data, and resetting the data stored in said third register to zero when the updated data in said third register becomes equal to or more than the data stored in said fifth register until the data stored in said third register coincides with data stored in said fourth register.

5. The direct memory access controller according to claim 4, further comprising:
   a sixth register which stores the unit amount of data read by one-time bus operation;
   a seventh register which stores the unit amount of data written by one-time bus operation; and
   an eighth register used as a work area; wherein
   said control section repeatedly reads data from a transfer source a plurality of times when the amount of data designated by the data stored in said seventh register is larger than the amount of data designated by the data stored in said sixth register, unites each obtained data into the amount of data designated by the data stored in said seventh register by using said eighth register, and writes the united data in a transfer destination by one-time write operation.

6. The direct memory access controller according to claim 4, further comprising:
   a sixth register which stores the unit amount of data read by one-time bus operation;
   a seventh register which stores the unit amount of data written by one-time bus operation; and
   an eighth register used as a work area; wherein
   said control section reads the amount of data designated by the data stored in said sixth register from a transfer source by one-time read operation when the amount of data designated by the data stored in said sixth register is larger than the amount of data designated by the data stored in said seventh register, temporarily stores the obtained data in said eighth register, and writes the data stored in said eighth register in a transfer destination by a plurality of times of write operations.

7. A direct memory access controller comprising:

a first register which stores the fixed address of a transfer-source area;

a second register which stores the base address of a transfer-destination area;

a third register which stores a data write position in the transfer-destination area as the offset from the base address stored in said second register;

a fourth register which stores a read position when a process for reading data from a transfer destination reads data from the same transfer destination at the next time as the offset from the base address stored in said second register;

a fifth register which stores a value that indicates a total amount of transferred data; and a control section which provides a control for repeating an operations for reading data from a transfer-source address represented by the data stored in said first register, writing the read data in a transfer-destination address decided in accordance with the data stored in said second register and said third register, updating the data stored in said third register by the amount of transferred data, and resetting the data stored in said third register to zero when the updated data in said third register becomes equal to or more than the data stored in said fifth register until the data stored in said third register coincides with the data stored in said fourth register.

8. The direct memory access controller according to claim 7, further comprising:

a sixth register which stores the unit amount of data read by one-time bus operation;

a seventh register which stores the unit amount of data written by one-time bus operation; and an eighth register used as a work area; wherein said control section repeatedly reads data from a transfer source a plurality of times when the amount of data designated by the data stored in said seventh register is larger than the amount of data designated by the data stored in said sixth register, unites each obtained data into the amount of data designated by the data stored in said seventh register by using said eighth register, and writes the united data in a transfer destination by one-time write operation.

9. The direct memory access controller according to claim 7, further comprising:

a sixth register which stores the unit amount of data read by one-time bus operation;

a seventh register which stores the unit amount of data written by one-time bus operation; and an eighth register used as a work area; wherein said control section reads the amount of data designated by the data stored in said sixth register from a transfer source by one-time read operation when the amount of data designated by the data stored in said sixth register is larger than the amount of data designated by the data stored in said seventh register, temporarily stores the obtained data in said eighth register, and writes the data stored in said eighth register in a transfer destination by a plurality of times of write operations.

10. A direct memory access control method comprising the steps of:

reading data from a transfer-source address decided in accordance with the base address of a transfer-source area and a first offset from the base address of the transfer-source area;

updating the first offset by the read amount of data;

writing the read data in a transfer-designation address decided in accordance with the base address of a transfer-destination area and a second offset from the base address of the transfer-destination area; and updating the second offset by the written amount of data, wherein all the steps are repeated until the updated second offset coincides with the value that indicates the total amount of transferred data.

11. The direct memory access control method according to claim 10, wherein reading of the data from a transfer source is repeated a plurality of times when the unit amount of data written by one-time bus operation is larger than the unit amount of data read by one-time bus operation and each obtained data is united into the unit amount of data written by one-time bus operation and written in a transfer destination by one-time write operation.

12. The direct memory access control method according to claim 10, wherein the data read by one-time read operation is divided into every unit amount of data written by one-time bus operation when the unit amount of data read by one-time bus operation is larger than the unit amount of data written by one-time bus operation and written in a transfer destination by a plurality of times of write operations.

13. A direct memory access control method comprising the steps of:

reading data from a transfer-source address decided in accordance with the base address of a transfer-source area and the offset from the base address of the transfer-source area;

writing the read data in the fixed address of a transfer-destination area;

updating the offset by the transferred amount of data; and resetting the updated offset to zero when the updated offset becomes equal to or more than a value that indicates a total amount of transferred data, wherein all the steps are repeated until the offset coincides with the offset from the base address of a transfer-source area at a write position when a process for writing data in the same transfer source writes data in the same transfer source at the next time.

14. The direct memory access control method according to claim 13, wherein reading of the data from a transfer source is repeated a plurality of times when the unit amount of data written by one-time bus operation is larger than the unit amount of data read by one-time bus operation and each obtained data is united into the unit amount of data written by one-time bus operation and written in a transfer destination by one-time write operation.

15. The direct memory access control method according to claim 13, wherein the data read by one-time read operation is divided into every unit amount of data written by one-time bus operation when the unit amount of data read by one-time bus operation is larger than the unit amount of data written by one-time bus operation and written in a transfer destination by a plurality of times of write operations.

16. A direct memory access control method comprising the steps of:

reading data from the fixed address of a transfer-source area;

writing the read data in a transfer-destination address decided in accordance with the base address of a transfer-destination area and the offset from the base address;

updating the offset by the transferred amount of data; and resetting the updated offset to zero when the offset becomes equal to or more than a value that indicates a total amount of transferred data, wherein all the steps are repeated until the offset coincides with the offset from the base address of the transfer-destination area at a read position when a process for reading data from the same transfer destination reads data from the same transfer destination at the next time.

17. The direct memory access control method according to claim 16, wherein reading of the data from a transfer source is repeated a plurality of times when the unit amount of data written by one-time bus operation is larger than the unit amount of data read by one-time bus operation and each obtained data is united into the unit amount of data written by one-time bus operation and written in a transfer destination by one-time write operation.

18. The direct memory access control method according to claim 16, wherein the data read by one-time read operation is divided into every unit amount of data written by one-time bus operation when the unit amount of data read by one-time bus operation is larger than the unit amount of data written by one-time bus operation and written in a transfer destination by a plurality of times of write operations.

* * * * *